May 20, 1958 W. T. DAVIS 2,835,371
COLLAPSIBLE TUBE HANDLING MECHANISM
Filed Sept. 14, 1953 8 Sheets-Sheet 1

Fig. 1.

INVENTOR.
WALTER T. DAVIS.
BY
ATTORNEYS.

May 20, 1958 W. T. DAVIS 2,835,371
COLLAPSIBLE TUBE HANDLING MECHANISM
Filed Sept. 14, 1953 8 Sheets-Sheet 3

Fig. 2A.

INVENTOR.
WALTER T. DAVIS.
BY
Christy, Parmelee Stickland
ATTORNEYS.

May 20, 1958  W. T. DAVIS  2,835,371
COLLAPSIBLE TUBE HANDLING MECHANISM
Filed Sept. 14, 1953  8 Sheets-Sheet 4

Fig. 3.

INVENTOR.
WALTER T. DAVIS.
BY
ATTORNEYS.

INVENTOR.
WALTER T. DAVIS.
BY
ATTORNEYS.

May 20, 1958  W. T. DAVIS  2,835,371
COLLAPSIBLE TUBE HANDLING MECHANISM
Filed Sept. 14, 1953  8 Sheets-Sheet 6

INVENTOR.
WALTER T. DAVIS.
BY
*Christy, Parmelee & Strickland*
ATTORNEYS.

Fig.14.

May 20, 1958 W. T. DAVIS 2,835,371
COLLAPSIBLE TUBE HANDLING MECHANISM
Filed Sept. 14, 1953 8 Sheets-Sheet 8

Fig.16.

INVENTOR.
WALTER T. DAVIS.
BY
ATTORNEYS.

United States Patent Office 2,835,371
Patented May 20, 1958

2,835,371
COLLAPSIBLE TUBE HANDLING MECHANISM

Walter T. Davis, Wheeling, W. Va., assignor to Wheeling Stamping Company, Wheeling, W. Va., a corporation of West Virginia Application September 14, 1953, Serial No. 379,831

18 Claims. (Cl. 198—24)

This invention relates to mechanism for handling collapsible tubes, and has particular application to any operation where collapsible tubes are transferred from a conveyor to a mandrel, or from a mandrel to a conveyor, or from one conveyor to another, especially in situations where the coating on the exterior of the tube is not hardened.

The invention is especially adapted for use in the coating of tubes where the tubes are put on a mandrel, coated, and then removed and placed on a conveyor to be carried through an oven where the coating is hardened. It will be in this particular application that the invention hereinafter disclosed will be described, but it will be understood that the invention is not limited to such particular application.

In the manufacture of collapsible tubes, such as tooth paste tubes, the tube is first formed by extrusion. The bottom end of the tube at this time of course is open, and the tube has a cylindrical body, a tapering shoulder, and a neck with a central discharge opening therethrough. In the operation of coating, the tubes are placed one at a time on the mandrels of a turret-like machine, and these mandrels are then brought into contact with coating rolls which spread a coating over the cylindrical exterior of the tube. In some instances a coating is also applied to the shoulder of the tube. These tubes must then be placed on a conveyor and carried through an oven where the coating is hardened. After the coating is hardened, a similar operation may be done to apply the printing and decorating. The conveyors used for this purpose must be such as to prevent the exterior of the tubes from coming into contact with one another, or from any surface which might mar the coating or the printing until the coating or decorating material is hardened. Consequently the conveyors used for this purpose are chain conveyors having pins projecting perpendicularly therefrom, and which are maintained in horizontal or upwardly-turned positions as long as the tubes are in place, the pins being inverted only at times when no tubes are mounted thereon. The tubes, upon being removed from the mandrels, are set on the pins of the conveyor, the pin entering the hollow interior of the tube, thereby supporting the tube in such a manner that the surface cannot contact any other object. This conveyor, as indicated above, then travels through an oven.

The operation as now performed requires that an attendant, usually a girl, apply the tubes to the mandrels on the turret of the printing machine, and after the tube is coated the attendant must grasp the neck of the tube with the thumb and two forefingers, being very careful to avoid contacting the body of the tube and where the shoulder is coated, being also careful to avoid having her fingers contact the shoulder of the tube. Upon removing the tube from the mandrel, she must then place it individually on one of the conveyor pins. This is a tedious and tiresome operation, and even an experienced operator is apt to bring the tubes into contact with some surface which will mar them. She is also quite likely to get the coating on her fingers and transfer it to the neck or shoulders of succeeding tubes, thereby spoiling them for commercial purposes. Also the speed of the coating operation is limited to the speed at which the operator can handle the tubes.

An object of the present invention is to provide an apparatus from which tubes can be transferred from one conveyor to another, or from a mandrel to a conveyor without the exterior of the tubes being brought into contact with any other tube or any other object, without danger of smearing unhardened paint or ink, and without any manual intervention.

A further object of the invention is to provide in combination with the coating machine or a printing machine as the case may be, apparatus for applying the tubes to the mandrels on the turret of the printing machine, removing the tubes after they have been coated from the mandrels, and transferring the tubes to a conveyor, all without intervention on the part of the operator, and without likelihood of marring the tubes.

These and other objects and advantages are attained by my invention as will hereinafter more fully appear. It may be noted that in the machine hereinafter described, the operations are performed entirely on tubes which have not been perviously capped.

My invention may be more fully understood by reference to the accompanying drawings, in which:

Fig. 2 shows the position of the parts just before the application of one tube to a coating machine mandrel, and just prior to the removal of a coated tube from a preceding mandrel.

Printing or coating machines of the kind herein referred to are now well known in the art, and per se form no part of the present invention. Consequently, as above stated, the drawings omit much of the details of these machines, and only sufficient parts of the machines have been illustrated as is necessary to the explanation of the present invention and an understanding of its environment.

The machine as illustrated comprises a supporting frame designated generally as 2 having mounted thereon near one end a horizontal shaft 3 that carries a large circular plate 4 hereinafter referred to as the turret. Projecting horizontally from the turret are a plurality of equally-spaced mandrels 5 which are mounted in the plate 4 so as to rotate freely. The mandrels 5 are as close to the periphery of the disk as is mechanically feasible. A drive mechanism is provided by which the turret is intermittently rotated, the increment of movement on each operation being equal to the number of degrees separating one mandrel from another. For example, assuming that there are six mandrels, the turret is operated through an arc of 60° at each operation. This drive includes a Geneva gear (not shown in detail) driven through a sprocket chain from a drive gear and sprocket A. This sprocket gear has a bevel gear A' at its outer face.

Supported on the bed at one side of the turret is a coating mechanism having a coating or inking roll 6, the periphery of which is so located as to press against a tube T (see Fig. 1) which is supported on the mandrel when the mandrel carrying the tube is carried past the coating roll. The coating roll is continuously driven, and by its contact with the tube, turns the mandrel and the tube as it applies coating to the tube, thereby coating its cylindrical surface. Associated with the coating roll 6 are cooperating applicator rolls 7 and 8 of usual construction, which carry the coating material from a tray and spread it evenly onto the surface of the coating rolls. These rolls are all geared together, as indicated at 9, and are driven by mechanism (not shown). Additionally, there may be supported near the inking roll 6 a small frame 10 (see Fig. 1) which is at an angle to the axis of the mandrels, and which has a narrow coating roll 11 designed to bear against the neck of the tube, and 12 is a spreading roller for applying coating to the roller 11. Roller 11 is driven through a pulley 13 and belt 14 from mechanism which also drives the main coating roll 6, this drive forming no part of the present invention, and for purposes of clarity of disclosure, it has not been illustrated. The function of the unit 10 and its associated parts is to apply coating to the shoulder of the tube where a lacquer or coating is used on this portion of the tube.

So much of the mechanism as has been described is typical of machines of this kind now in general use, and per se forms no part of the present invention.

According to the present invention the drive mechanism which operates the turret 4 through a Geneva gear or other intermittent gearing, also continuously rotates a crank disk 15 having a radially-adjustable crank pin 16 thereon. The crank disk is on a shaft 15a that has a bevel gear 15b meshing with a pinion A' on the drive gear. This crank pin is connected with one end of an adjustable link 17. The other end of the link 17 is connected to a lever 18 intermediate the ends of said lever, said lever being fulcrumed at 19 on a stationary bracket depending from the machine frame. The free upper end of the lever 18 is pivotally connected at 20 to a slide bar 21 carried in guides 22 on the frame of the machine. The arrangement is such that the rotation of the crank disk 15 causes the lever to oscillate, and such oscillation is translated into a rectilinear reciprocal motion on the slide bar 21. The lever 18 is shown slitted where the fulcrum pin 19 passes therethrough to accommodate the change in the effective length of the lever 18, which is necessary by reason of its outer end being fixed at 20 to the rod 21.

Figure 2:
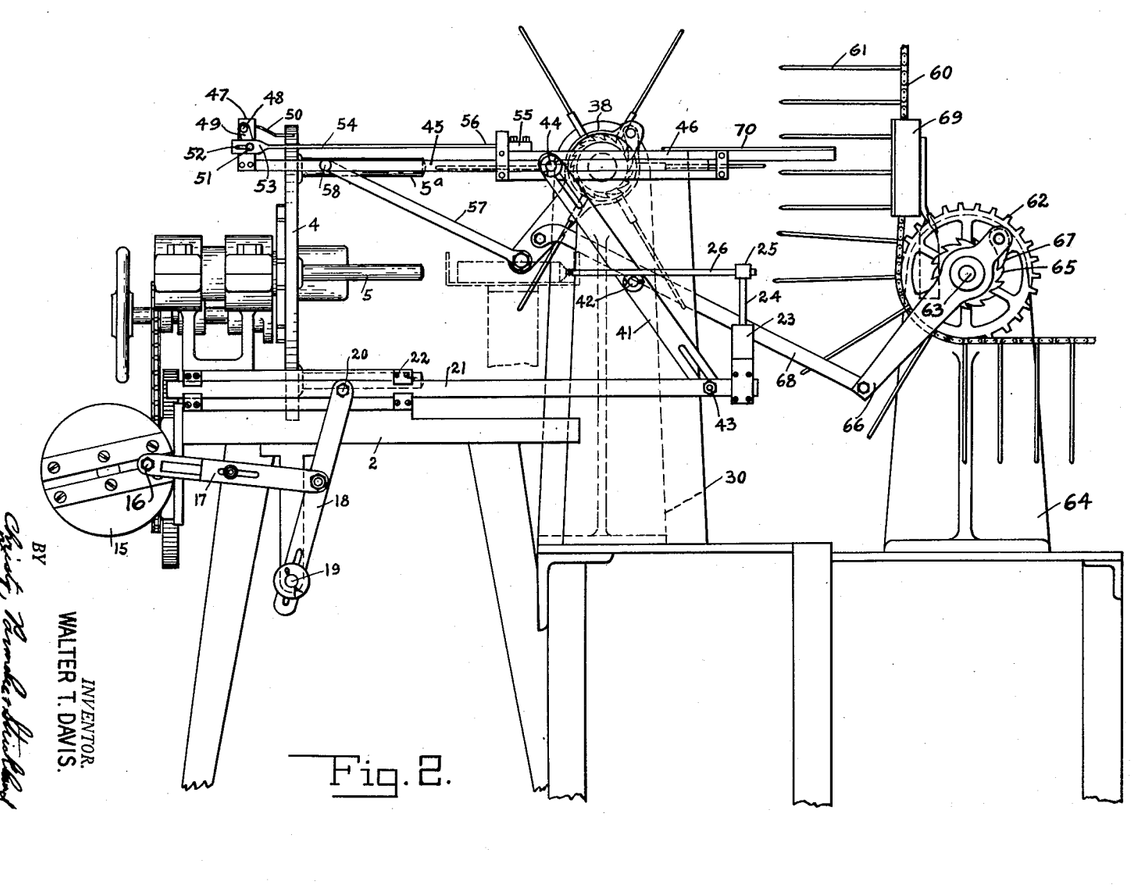
Fig. 2 is a side elevation of a coating machine and transfer mechanism embodying my invention.
Figure 2A:
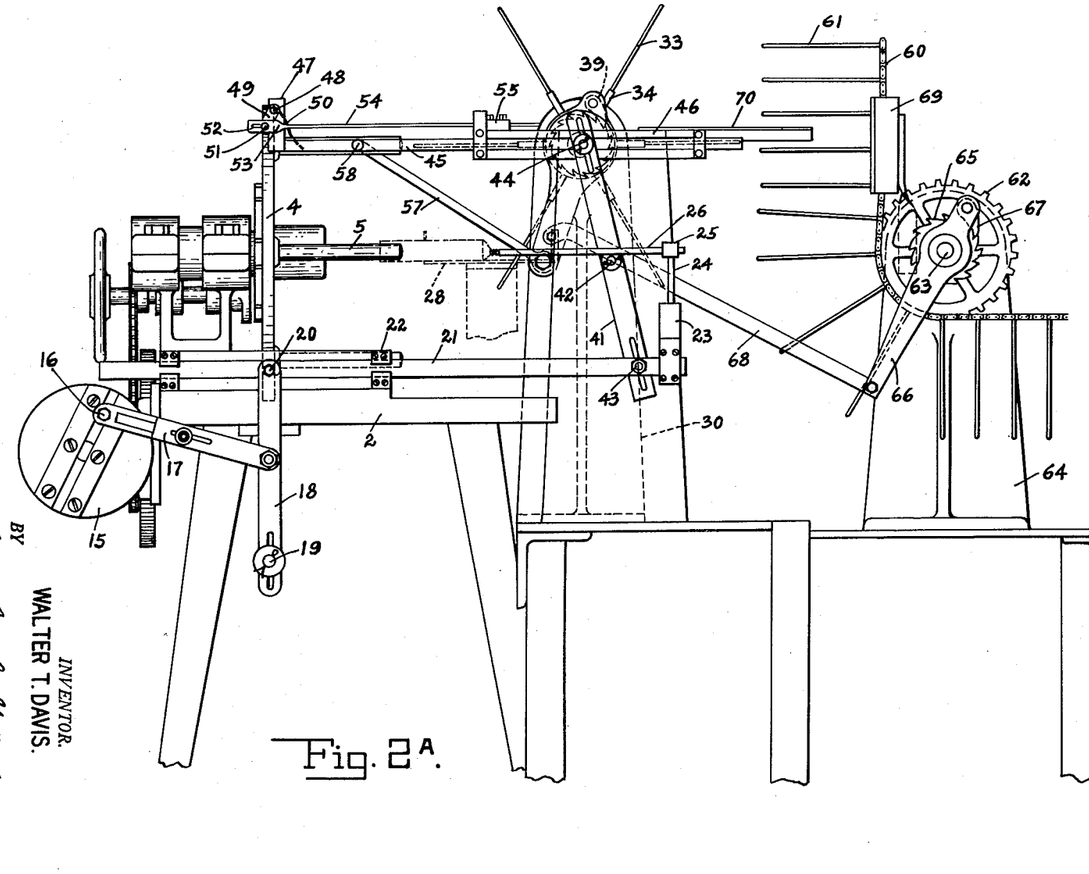
Fig. 2a is a view similar to Fig. 2, showing the tube being advanced to the mandrel.
Figure 3:
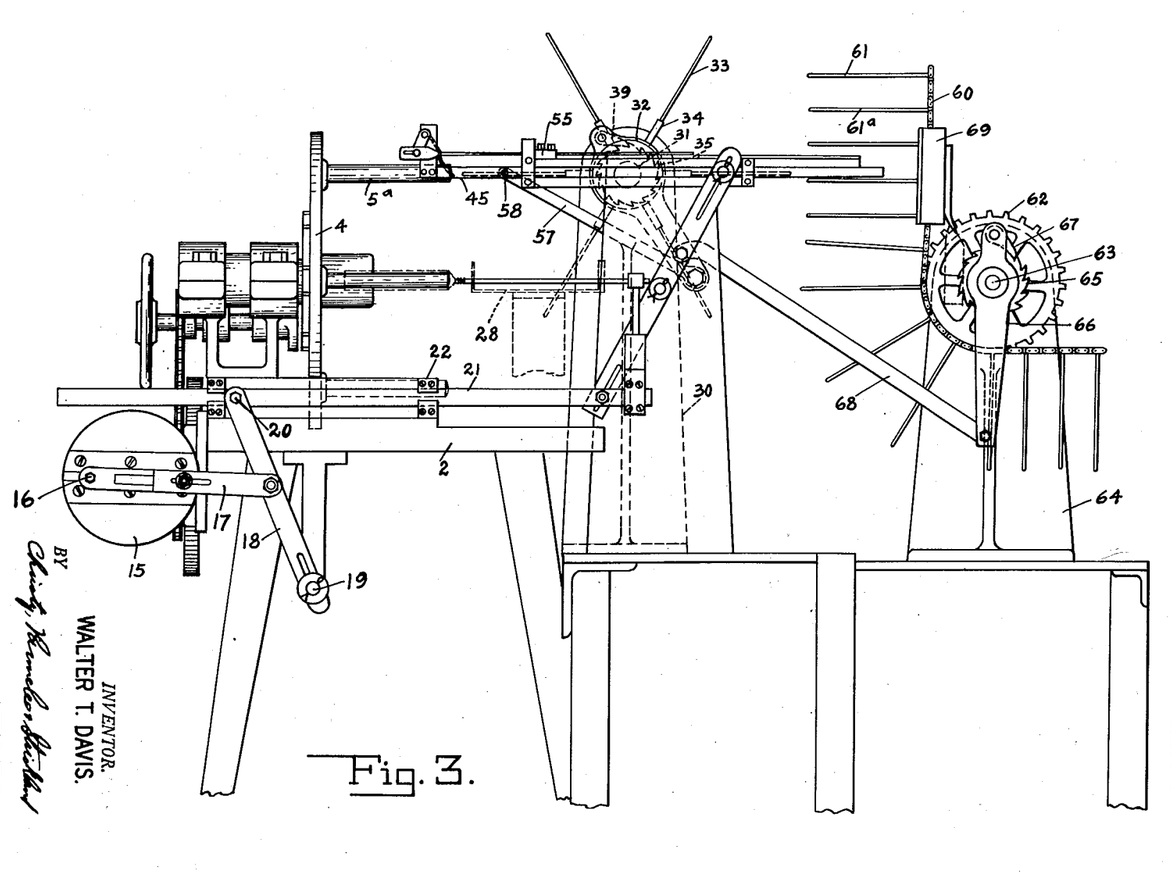
Fig. 3 is a view similar to Fig. 2 showing the position of the parts immediately upon the application of one tube to a mandrel, and the removal of a coated tube from a preceding mandrel.

The rod 21 has an upright support 23 at the right-hand end as viewed in Figs. 2 and 3, in which is carried a post 24 having a clamp 25 at the top thereof for supporting a horizontally-extending pusher rod 26 that is directed toward the turret 4, although remote from such turret.

Figure 1:
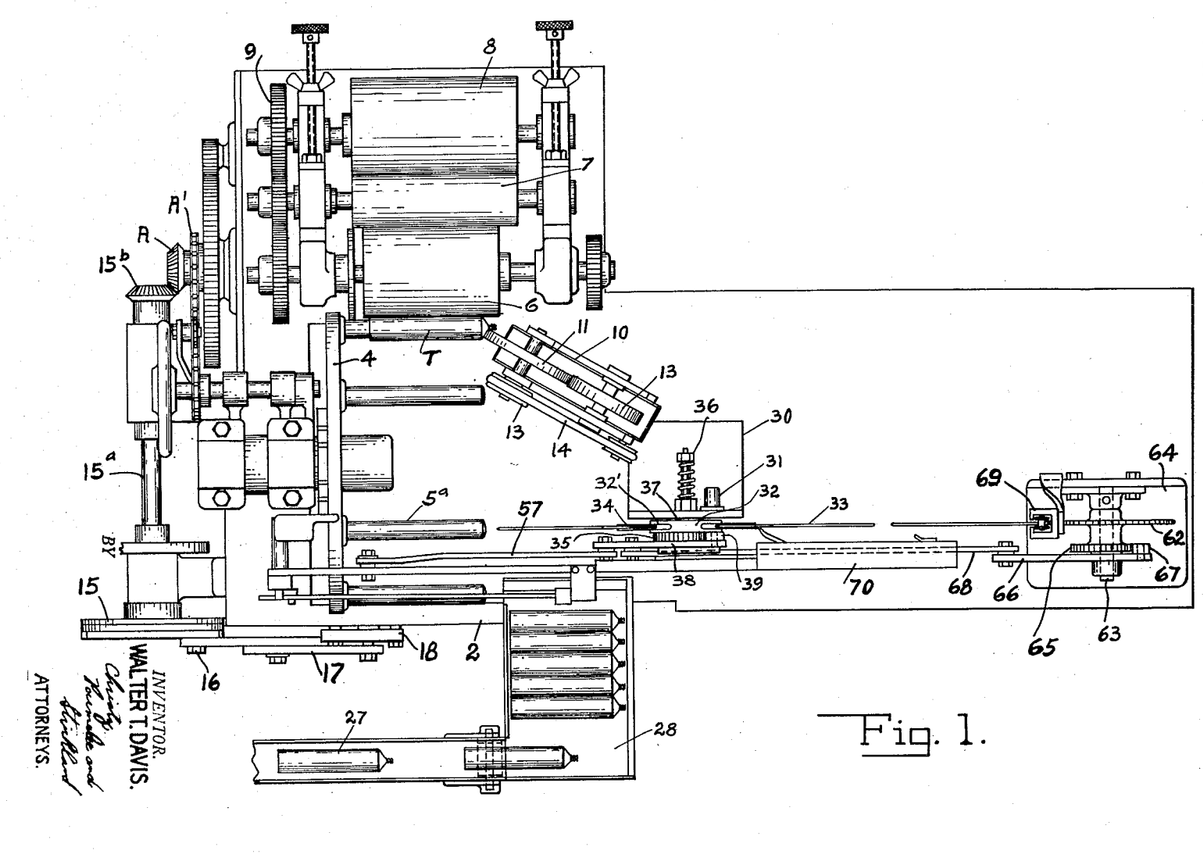
Fig. 1 is a top plan view of a printing machine and transfer mechanism embodying my invention, and it may be pointed out that being well known in the art, and for purposes of more clearly showing my invention, much of the details of the coating or printing machine have been omitted.

Referring to Fig. 1, a narrow belt conveyor 27 leading from the extension press (not shown) discharges the tubes as they are formed, onto an inclined tray 28 that slopes downwardly toward the pin 26, and the relation of this tray is such that the pin 26 is caused to travel across the lower end of the tray when the bar 21 is reciprocated. The tubes are always dropped onto the belt 27 with the neck end pointing toward the right as viewed in Fig. 1, and consequently they are all oriented in this direction as they roll down the tray 28. When the parts are in the position shown in Fig. 2, the lowermost tube on the tray 28 positions itself by gravity in alignment with the push rod 26. This push rod in turn is accurately aligned with the axis of the mandrel 5 on the turret when one of the mandrels 5 is in the tube-receiving station. As shown in Fig. 3, when the crank 15 rotates through an arc of 180° from the position shown in Fig. 2, the push rod 26, operating across the bottom of the tray 28, pushes the tube onto the mandrel 5. In this manner each time a mandrel 5 is brought to tube-receiving position, a tube is applied to it through the operation of the machine. It is for this reason that the drive for the crank disk 15 is coupled into the drive for the turret 4, and the movements of the various parts synchronized. The turret 4 rotates in a counter-clockwise direction, and after the tube has been applied in the manner indicated, the tube is carried down to a succeeding station, and eventually passes up into contact with the coating roll 6. It is thereafter brought around to a position at the top of the turret where it is to be removed.

In the operation of removing the tube, it is to be recalled that its surface is now covered with the wet coating material. It must therefore be slipped off the mandrel in a manner which will not mar the coating, put onto a transfer device, and from the transfer device be moved to a position where it is again transferred to the conveyor pin. According to the present invention, there is a vertical support of column 30 extending upwardly from the bed of the machine. On this column is carried a stud shaft 31, the axis of which exactly corresponds to the level of the mandrel which at any time happens to be at the tube-removing position, this position of the mandrel, for purposes of designation, being marked 5a in Figs. 1, 2 and 3. Rotatable on this stud shaft is a hub 32 from which radiate an even number of slender pins or spokes 33 which are slightly enlarged at their inner ends as indicated at 34. Six such spokes are shown in the drawings. This hub also has an annular series of ratchet teeth thereon, the ratchet being designated 35. The face of the hub, which is toward the support, has six indexing or detent notches therein, this face of the hub being indicated by the reference numeral 32' in Fig. 1. The supporting structure 30 has a housing 31 thereon which contains a spring-pressed detent pin of a well known type, the end of which rides against the face 32' of the hub, and which snaps in succession into the recesses as the hub rotates for accurately indexing the hub and holding it against free rotation. Also, by taking up on a nut 36 at the end of the stud shaft 31, a pressure of the hub against a friction surface 37 can be adjusted so as to further restrain the hub against free rotation.

An operating yoke or collar 38 encircles the hub, and it has a pawl 39 which engages in the ratchet teeth 35, the arrangement being such that when the collar is rotated in one direction, the hub is also rotated, but when the collar is moved in the reverse direction, the pawl rides over the ratchet teeth and no movement of the hub takes place. The yoke or collar has an operating extension 40 thereon. The hub and spokes 33 are so positioned, and the detent is so arranged, that the hub will always stop with one of the pins 33 directly confronting the center of the mandrel at station 5a, and the diameter of the pin or spoke 33 above the shoulder 34 is slightly smaller than the hole in the neck of the collapsible tube. I have designated the hub and spoke assembly as a transfer wheel. The mechanism for operating the yoke or collar to turn the transfer wheel will be hereinafter described.

A lever 41 is pivotally supported at 42 between its ends on the column 30. It is slotted at its lower end, and has a pin 43 which passes therethrough, and which also passes through the slide rod 21, so that when the slide rod 21 reciprocates, the lever 41 is caused to oscillate. The slotted upper end of the lever 41 has a pin 44 passing therethrough, and this pin also passes through a slide bar 45 that is carried in a guide structure 46 at the top of the column 30. By this arrangement, when the slide rod 41 moves toward the left as viewed in Fig. 2, the slide bar 45 is moved toward the right, and vice versa. In Fig. 2 the parts are shown with the rod 21 at the extreme right-hand limit of its travel.

The bar 45 as viewed in Fig. 2 has a supporting block 47 at its extreme left-hand end. A small rotatable pin or shaft 48 passes transversely through the upper end of the block 47, and at the front of the block as viewed in Fig. 2, this shaft has a small crank arm 49 thereon, while at the opposite side of the block it has a flap or finger 50. In the position shown in Fig. 2, the free end of the flap or finger 50 is resting on the periphery of the turret 4.

The crank arm 49 of the shaft 48 has a pin 51 that is entered in a slot 52 in the flattened terminal portion 53 of a rod 54, which rod extends parallel with the slide bar 45, and which passes through a stationary friction block 55 supported at the left-hand end of the guide structure 46. As indicated in Fig. 7, the rod 54 is reduced in diameter at 56. This is more clearly shown in Figs. 4 to 6, 7 and 8. The friction block 55 is a split body of fiber having a passageway therethrough to accommodate the rod 54, and by means of set screws its friction on the rod can be such that the reduced part of the rod slides freely in the friction block, while the part of larger diameter encounters a drag or resistance. This is necessary to produce the relative motion hereinafter described.

Figure 4:
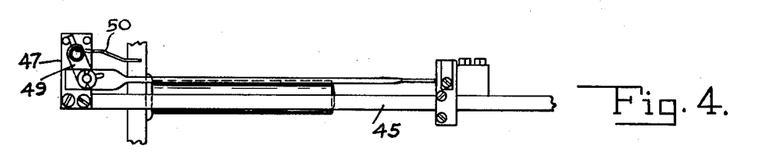
Fig. 4 is a side elevation of the apparatus for removing the coated tube from the mandrel with the parts in the position shown in Fig. 2, i. e., just before the process of removing a coated tube is to be effected.
Figure 5:
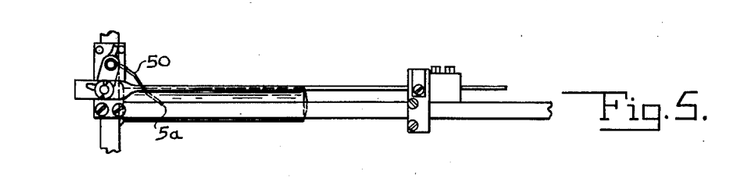
Fig. 5 is a view similar to Fig. 4, showing the next step in the operation of the mechanism for removing the coated tube.

Referring to Fig. 4, the parts are in the same position as is illustrated in Fig. 2. When the bar 45 moves to the right as viewed in Figs. 2 and 4, the block 47 is also carried toward the right. Just after this motion occurs, and there has been sufficient travel, the part of the rod 54 which is of larger diameter, starts to push through the friction block 55. This causes it to encounter resistance, whereupon it moves to the left relatively to the bar 54, rocking the arm or crank 49 from the position shown in Fig. 4 to the position shown in Fig. 5. This causes the terminal of the finger or flap 50 to snap down quickly and at a steep angle after clearing the turret onto the surface of the mandrel at position 5a just behind the end of the collapsible tube positioned on this mandrel. Then as the bar 45 continues to move toward the right as viewed in Fig. 5, the end of the finger or flap riding along the mandrel shoves the tube off the mandrel, and the friction of the rod in the friction block holds the stripping finger from riding up on the end of the tube. As the tube is thus pushed off the mandrel, it slides onto that pin or spoke 33 of the transfer wheel or hub, which at that moment is in direct alignment with the center of the mandrel, and the tube is thus transferred from the mandrel to one of the spokes 33. At the time that this removal of the coated tube and its transfer to the spoke 33 of the transfer wheel has taken place, the turret 4 and the hub are stationary.

As shown in Figs. 2 and 3, an operating link 57 has one end pivotally connected to the operating extension 40 of the yoke or collar 38, and its other end pivotally connected at 58 to the slide bar 45. Thus as the slide bar 45 moves toward the right from the position shown in Fig. 2, the collar is rotated in a counterclockwise direction, at which time the pawl is riding over the ratchet teeth, and no movement of the transfer wheel is effected.

According to the timing of the machine, when the tube has been thus transferred to the spoke 33 of the transfer wheel, the turret then is set into motion to advance all of the mandrels one step, moving the mandrel from which the tube has just been removed, down to the station where the tubes are applied, and a mandrel on which a previously coated tube is carried, moves up into position to be stripped. At this time the tube-stripping flap or finger 50 is then in the position shown in Fig. 6. A rotation of the turret takes place, all of the other parts are in the position referred to in Fig. 3, and after the turret has finished its movement, or while it is finishing its movement, the direction of the slide bar 21 is reversed, and it starts to move to the left as viewed in Fig. 3. In so doing it pushes a tube on the empty mandrel at the loading station as previously described. Also the lever 41 starts to move the slide bar to the left, and as the slide bar moves to the left, the link 57, operating through the extension 40 on the collar 38, rotates the collar in a clockwise direction, turning the transfer wheel with its spokes 33 in a clockwise direction. The spoke which has just received a tube moves upwardly through an arc of 60°, so that the tube cannot slide off the spoke while the end of the tube neck bears on the shoulder 34. When the 60° movement of the transfer wheel has been effected, the rod 45 will be back in the position shown in Fig. 2, and another spoke or pin 33 will be in central alignment with the next mandrel on the turret which has then been brought to position, and the cycle of stripping will repeat itself.

Figure 6:
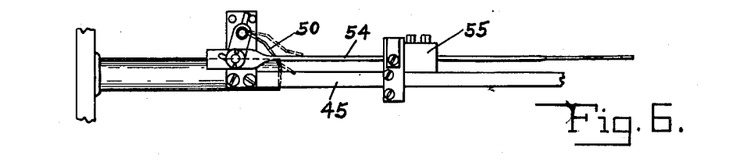
Fig. 6 is a view similar to Fig. 5, showing the position of the parts at the instant when the tube has been removed.
Figure 7:
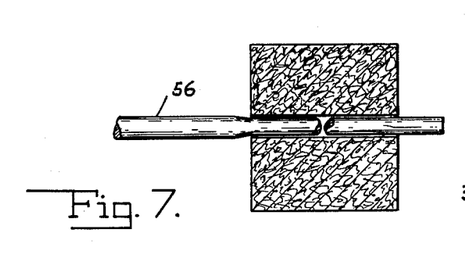
Fig. 7 is a fragmentary view on a larger scale, showing the rod and friction arrangement through which the operation of the tube-removing device is controlled, with the parts in the position which they assume when the mechanism is in the position shown in Fig. 4.
Figure 8:
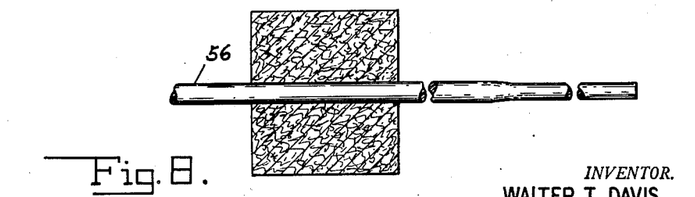
Fig. 8 is a similar view when the parts are in the position shown in Figs. 5 and 6.
Figure 9:
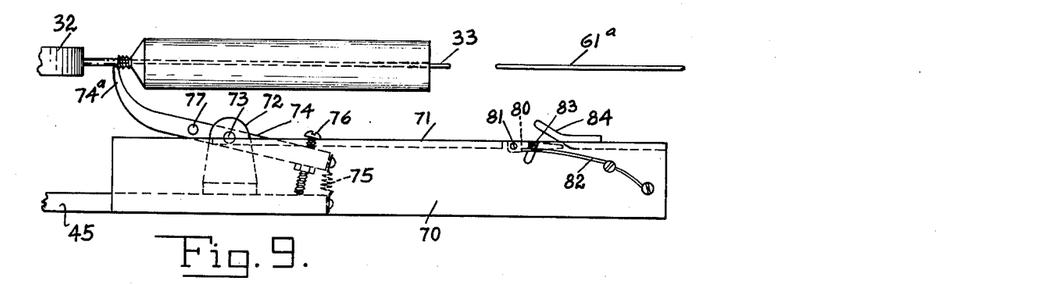
Fig. 9 is a fragmentary top plan view on a larger scale than Fig. 1 of the portion of the mechanism which transfers the previously-coated tube from the transfer wheel or spindle to the conveyor pin, the parts being in the position which they assume when the other elements of the machine are in the position shown in Fig. 2, and wherein the operation of removing the tube from the spindle of the transfer wheel to the conveyor pin is about to begin.
Figure 10:
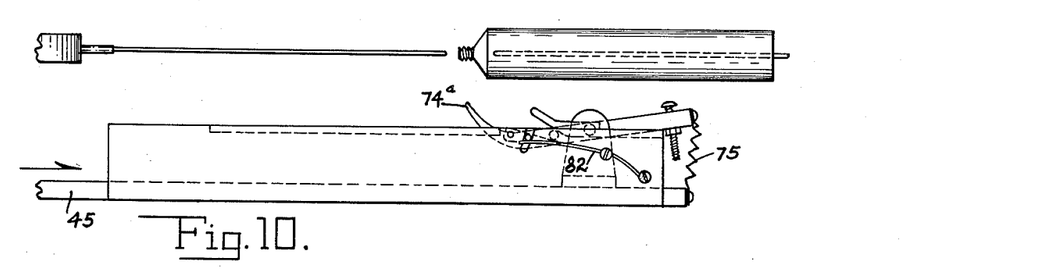
Fig. 10 is a similar view, wherein the tube has been transferred to the conveyor pin and the parts are moving in position to begin their return travel.
Figure 11:
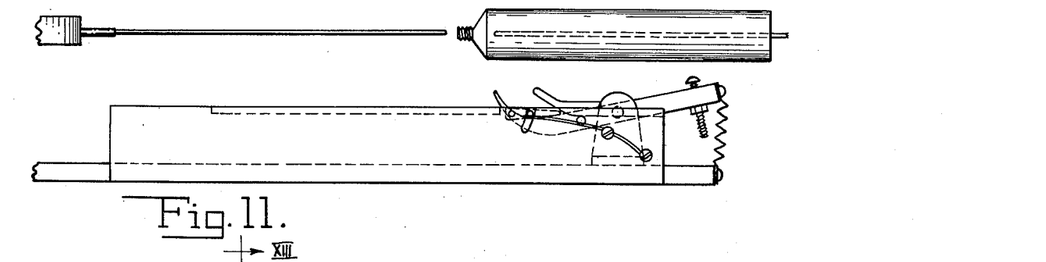
Fig. 11 is a view similar to Fig. 10, showing the parts at the extreme opposite limit of their travel from Fig. 9.

It should be noted that as soon as the bar 45 starts to move to the left as viewed in Fig. 6, the large diameter of the rod 54 drags in the friction block 55. This instantly causes a limited relative movement of the rod 54 toward the right with respect to the bar 45. This relative movement operates to instantly raise the take-off finger 50 from the full-line position shown in Fig. 6 to the dotted line position, so that as the finger moves back to the position shown in Fig. 4, it is entirely clear of the freshly-coated tube on the mandrel which has just been brought into position to be stripped. As the bar 45 approaches its left-hand limit of movement, the large diameter part of the rod moves clear of the friction block, and the finger or flap can ride back onto the periphery of the turret freely and thus reach a position where it is ready for the next cycle of operation.

The foregoing operation of the finger is important to assure that the finger will snap in almost instantly behind each tube as it is to be pushed off, and in moving to the right as shown in Fig. 4 to the position shown in Fig. 6, it must push the tube onto the pin 33 far enough so that the end of the tube is entirely clear of the mandrel on the turret and avoid any mutilation of the tube when the turret starts to rotate. The operation moreover is important because the finger is prevented from riding over the new tube which has been brought into place just before the return movement of the finger has started.

After the tubes have been put onto the spokes of the transfer wheel, they must be removed from said spokes and put in succession onto the pins of the conveyor. This operation is also effected by my machine as will now be described. The conveyor is shown in Figs. 2 and 3. It has a chain 60 from which project tube-supporting pins 61. In the particular arrangement shown in Figs. 2 and 3, the conveyor moves upwardly and is guided around a sprocket 62 where it moves from a horizontal direction into a vertical direction. This sprocket 62 is supported on a shaft 63 carried on a fixed column 64, and on one face of the sprocket wheel there is a series of ratchet teeth 65 corresponding to the ratchet teeth 35 on the hub 32. An operating lever 66 is hung on the pin 63 and has a pawl 67 that engages the ratchet teeth. This lever is connected through a link 68 with the operating extension 40 of the collar 35. The link 68 has an offset end 68' where it is pivotally connected with the operating extension 40. The arrangement is such that when the collar 38 is moving in a clockwise direction to rotate the transfer wheel with its spokes 33, the sprocket 62 is also rotated in a clockwise direction, and to a corelated extent, to bring one of the conveyor pins 61 into substantial alignment with that spoke 33 which is directly opposite the spoke which is then in tube-receiving position. It is a substantial alignment only, and preferably the tube-receiving pin is slightly lower than the confronting spoke of the transfer wheel. In the particular arrangement shown, there is a conveyor guide at 69 which may be optionally used. For purpose of designation, the conveyor pin which is in tube-receiving position in Figs. 2 and 3 is designated 61a.

It will be apparent from what has been so far described that the tubes are carried by the transfer wheel from the position where they are received from the coating machine mandrel through a vertical arc of 180°, and in so doing are reversed end for end. In other words, the neck of the tube is always pointed toward the center of the hub 32. It may also be stated that in most cases for the purpose of saving space, the transfer wheel is, as shown, disposed in a vertical plane, but it may operate equally well if positioned in a horizontal plane.

According to the present invention there is provided a mechanism which engages the end of the neck of the tube which is on that spoke 33 from which the tube is to be removed, and which slides the tube off the spoke onto the conveyor pin 61a without the outside of the tube encountering any other object. This mechanism is best shown in Figs. 9 to 12, but it is associated with the guide structure 46 for the slide bar 45 shown in Figs. 2 and 3. The right-hand end of the slide bar 45 as viewed in Fig. 2 projects under a metal plate 70 forming the top of the tube guide 46, and this plate 70 lies in a plane slightly above the plane of the spoke 33 on the hub 32. The edge of the plate 70 has a depending flange 71. The bar 45, where it projects under the plate 70, has a laterally-projecting bracket 72 in which is pivotally mounted at 73 a take-off lever or finger 74. The tube-engaging end of this finger is designated 74a, and as shown, it is curved toward the pin 33. The other end of the lever 74 is biased by a spring 75 which tends to swing the lever to the position shown in Fig. 9, while a set screw 76 limits the extent to which the lever can swing under the force of the spring 75.

Figure 12:
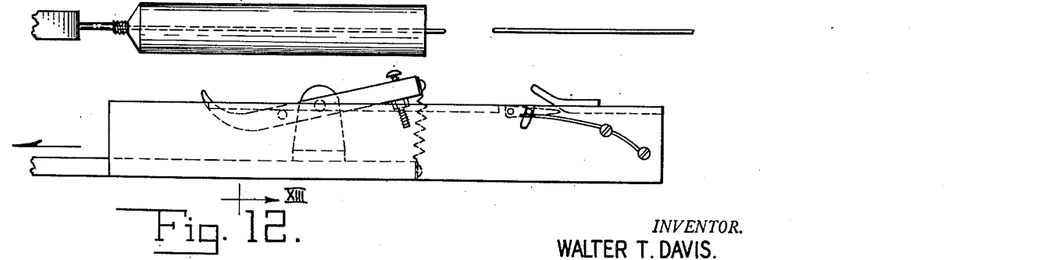
Fig. 12 is a view similar to Fig. 11 showing the parts in position just before they reach the position shown in Fig. 9.
Figure 13:
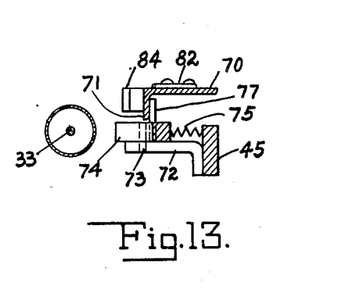
Fig. 13 is a transverse section in the plane of line XIII—XIII of Fig. 12.

The portion of the lever to the left of the pivot 73 has an upstanding pin 77 thereon. When the bar is in the position shown in Fig. 9 the pin 77 is beyond the end of the downwardly-turned flange 71, and the spring 75 has operated to thrust the terminal 74a of the finger out to a position where it will engage the neck of the tube on the pin 33. The pin 77 at this time is clear of the flange 71. Then as the rod 45 moves to the right in the manner previously described, the fingers 74, 74a will slide the tube from the spoke 33 onto the pin 61a of the conveyor which is then in approximate alignment with the spoke 33. Because the tube is being discharged with the conveyor pin entering the large base end of the tube, accurate registration between the pins on the conveyor and the spokes on the transfer wheel is not required. The finger must carry the tube far enough to the right so that the neck of the tube is entirely disengaged from the spoke 33, and there is clearance for the transfer wheel to rotate after the transfer of the tube to the conveyor pin has been made. After the tube has been transferred to the conveyor, the take-off finger must be returned to the position shown in Fig. 9, and this must be done in such manner that the fingers will be well out of the path of movement of the transfer wheel and of the next tube that is brought into place for removal. To this end the downwardly-turned flange 71 on the plate 70 is provided with a pivoted gate 80 near the right-hand end of the plate 70 as viewed in Fig. 9, this gate being pivoted about a pin 81. A wire spring 82 on the top of the plate 70 engages a pin 83 that projects upwardly from the gate through a slot in the plate 70, and this spring biases the gate to normally maintain a closed position parallel with the depending flange 71, and act as a continuation of that flange. Beyond the gate, the downwardly-turned flange 71 has an outwardly-protruding camming finger 84 which is in a position to be contacted by the pin 77 projecting up from the lever 74. The operation is that when the rod 45 has carried the stripping finger to a position just in advance of that shown in Fig. 10, the pin 77 will strike the camming finger 84, and as movement continues, the pin 77 will be guided inwardly, pressing against the free end of the gate 80, thereby drawing the terminal of the finger 74a laterally away from the tube which has just been put onto the conveyor. This operation of the finger also serves to stretch the spring 75. As the bar 74 reaches the right-hand limit of its movement, the pin 77 has then passed through the gate, which immediately snaps shut under the influence of the spring 82, and the pin 77 is then trapped behind the flange 21 and the gate, and the spring-biased finger is kept in the retracted position. The bar 45 then starts to move to the left from the position shown in Fig. 11, and the pin rides along behind the barrier or flange 71 as indicated in Figs. 12 and 13, keeping the finger entirely out of the path of the transfer wheel and the new tube that has been brought into place. As motion toward the left continues from the position shown in Fig. 12, the pin 77 will clear the barrier or flange 71, whereupon the finger will snap out to the position shown in Fig. 9, and the cycle of operation will be repeated.

From the foregoing description it will be seen that my machine provides for the automatic loading of tubes one by one onto the mandrels of a coated machine, and subsequently remove progressively onto a transfer wheel, and from the transfer wheel onto a conveyor, the complete operation being effected without mechanical intervention. All operations are performed in such manner that the coating on the tube cannot be damaged, and parts cannot pick up paint from one tube which they might rub off onto another tube. The operations are all co-related to the movement of the turret in the coating machine, so that the transferring operations take place when the turret is stationary, but the motions of the transfer wheel and conveyor take place when the tube-engaging fingers are withheld from any position where they can project into the path of the various moving mechanisms or come into contact with the freely-coated tubes.

While the mechanism requires accurate alignment of certain parts of the machine, once it has been set up it will continue to function indefinitely, and adequate tolerance is provided for the fact that the conveyors cannot be as accurately positioned with respect to the take-off mechanism as the transfer spokes must have with respect to the tube mandrels. All operations are synchronized so that once the machine is put into operation it automatically takes care of itself and the attendant is required only to carry on such inspection as is necessary, and to remove defective tubes and see that the coating machine is functioning properly. Because the machine is not dependent upon the dexterity of the operator, the coating machine can be speeded up to the maximum capacity of the press which supplies tubes to it.

Figure 14:
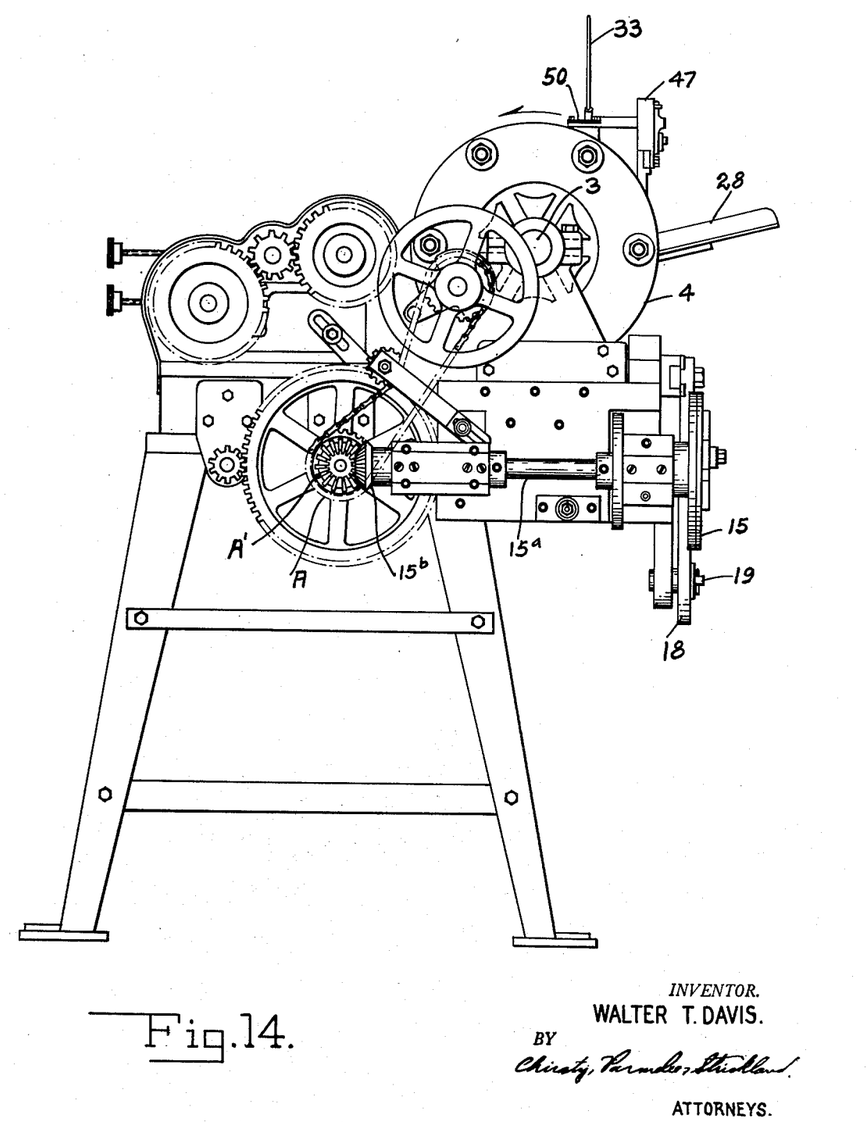
Fig. 14 is an end view of the coating machine with my invention applied thereto.
Figure 15:
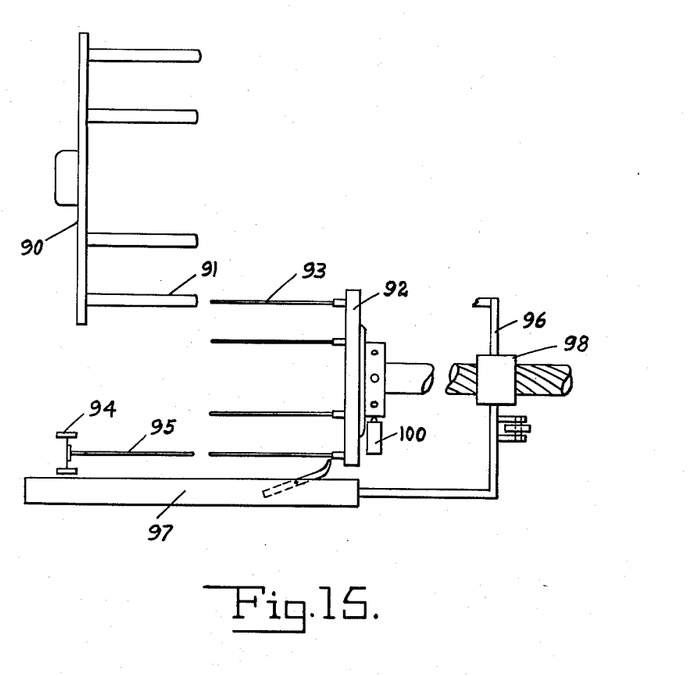
Fig. 15 is a schematic plan view of a modified arrangement in which the tubes are transferred axially instead of radially from the coating machine mandrel to the conveyor pins.

While I have described the invention primarily as applicable to a tube coating machine, they can also be used in connection with tube-decorating machines, in which printed matter is subsequently applied to the surfaces of the coated tubes and parts of the apparatus can be used wherever it is necessary to transfer a tube from one spindle or conveyor pin to another. Also in the specific mechanism which I have illustrated, the transfer wheel has spokes which are radial to the hub, which is a desirable relation in most circumstances. However, it will be seen by reference to Fig. 14 that my invention can be used where the tubes are not reversed end to end. In this figure the turret of the machine is designated 90, and 91 is one of the spindles. The transfer wheel in this case is shown at 92, and it has axially-projecting pins or spokes 93 instead of radial ones as previously described. These spokes are positioned at regular intervals around the disk 92 adjacent its periphery. The conveyor is designated 94, and it is provided with pins 95 similar to those previously described.

The take-off mechanism (not shown) may be operated by a cross-head at 96, and it would be a mechanism similar to that described in connection with Fig. 1, and the transfer mechanism for removing the tube from the spokes 93 onto the conveyor pins 95 is schematically indicated at 97. The two units are connected by the cross-head 96, and a spiral ratchet drive 98 of a well-known type or other mechanism may be used to rotate the disk 92 with each movement of the head 96 in one direction. The housing for the detent pin is indicated at 100.

Because the take-off mechanism and the mechanism designated 97 are similar ot those already described, it has been deemed unnecessary to repeat the detailed disclosure thereof. It is apparent, however, that since the conveyor pin 95 is alongside of the mandrel 91, that the unit 97 must be reversed to the extent that whereas in Fig. 9 it moves toward the right to transfer the tube from the transfer wheel to the conveyor, in Fig. 14 it must move to the left. This requires no change in the fundamental construction, but only a reversal end to end in the arrangement of the various parts.

While I have illustrated and described in detail certain specific embodiments of my invention, it will be understood that this is by way of illustration, and that various changes and modifications may be made within the contemplation of my invention and under the scope of the following claims.

I claim:

1. A collapsible tube handling mechanism comprising a fixed rotatable transfer wheel having a plurality of fixed spindles thereon, means for intermittently rotating the wheel to successively present one of said spindles to tube receiving position and another to tube discharging position, tube-supporting elements at each of said positions axially aligned with the spindles at the respective positions and in confronting relation thereto, a reciprocable pusher synchronized with the wheel operating mechanism movable along the tube-supporting element at the receiving position for shoving a tube neck end first from the confronting tube-supporting element to the aligned spindle of said wheel, another reciprocable pusher movable along the spindle at the discharging position for removing a tube base end first from a spindle of said wheel at the discharge position to the aligned tube supporting element at the discharge position, said second pusher being operatively connected with the first.

2. A collapsible tube handling mechanism as defined in claim 1 wherein the first pusher engages the base end of a tube and the second engages the neck end of the tube.

3. A collapsible tube handling mechanism as defined in claim 1 wherein the first pusher is operative as it moves toward the transfer wheel, and means are provided for moving it out of tube engaging position when it travels along the tube-supporting element in the reverse direction, and wherein the second pusher is operative when it moves in a direction away from the wheel and means for holding it out of tube engaging position on is movement in the opposite direction.

4. A collapsible tube handling mechanism as defined in claim 3 wherein the respective pushers are at opposite sides of the center of rotation of the wheel whereby each tube is carried by the wheel through an arc of approximately 180°.

5. A collapsible tube handling mechanism as defined in claim 3 wherein the wheel revolves about a horizontal axis and the respective pushers are at opposite sides of the center of rotation.

6. The combination with a collapsible tube coating machine having a turret with an annular series of equally spaced mandrels projecting from one face thereof and of the type in which the turret is intermittently rotated through equal angular increments to successively advance the mandrels from a loading to an unloading station and wherein the mandrels in so mving pass a coating unit for applying a coating to the tubes on the mandrel, means for applying tubes to the mandrels at the loading station, and reciprocal stripping means for engaging the base of a tube on the coating machine spindle at the unloading station for simultaneously removing coated tubes from the mandrel then positioned at the unloading station, a common drive mechanism driven by the coating machine for operating the tube applying and reciprocable stripping means together and at a time when the turret is stationary and a tube receiving and transfer wheel in fixed relation to the turret having a succession of equally spaced pins thereon that are successively aligned axially by intermittent rotation of the wheel through equal arcs of movement with the axis of the mandrel of the turret in the discharge station and in confronting relation thereto whereby the stripped tube is pushed onto a pin of the transfer wheel, and means for operating the turret wheel in synchronism with the turret.

7. The combination defined in claim 6 wherein there is a pin type conveyor juxtaposed at a point in its travel to the transfer wheel with its pins being brought into alignment and confronting relation to a pin on said wheel at a tube transfer station arcuately removed from the station where the tube is stripped from the mandrel onto the pin, reciprocable tube pushing means at said transfer station for engaging the neck end of the tube and pushing it from the transfer wheel pin onto a conveyor pin, means operatively connected with the transfer wheel operating mechanism for intermittently advancing the conveyor to bring a succeeding pin into position as the wheel is rotated one increment, said tube pushing means being operatively coupled with said means for removing the coated tubes from the mandrels to the transfer wheel.

8. The combination defined in claim 7 wherein the respective means for moving the tubes from the mandrel to the transfer wheel pins and from the transfer wheel pins to the conveyor pins are moved and held out of tube contacting position on their respective return motion after moving the tubes.

9. Apparatus for stripping a coated tube from a mandrel comprising a reciprocable bar, a pivoted pusher carried by the bar, a rocker rod connected with the pivoted pusher for moving said pusher into tube engaging position when the bar moves in one direction and swinging it out of tube contacting position when the bar moves in the opposite direction, and means for effecting relative movement between said bar and said rod to so operate the pusher, and a friction element operable on the rod and pusher assembly and restraining the pusher against free movement when it is out of tube-engaging position.

10. Apparatus as defined in claim 9 wherein said last named means comprises a fixed friction shoe through which the rod is slidable, said rod having portions of different diameter whereby the portion of smaller diameter is movable without effective friction through the shoe but the portion of larger diameter encounters resistance from the shoe as it slides therethrough.

11. Apparatus as defined in claim 10 wherein said bar also carries a second pusher for engaging a tube previously removed from the mandrel and pushed by the first pusher onto a transfer wheel from which the second one removes it, said second pusher comprising a pivoted member on the bar having a tube engaging terminal and a spring for urging the terminal into projected tube engaging position, a guide along which the part of the bar with the second pusher moves, means on the guide for holding the pivoted member in a position where the terminal is held out of tube engaging position, means at one end of the travel of the bar for moving the pivoted member into confined position back of the guide so that said terminal is out of tube engaging position as the bar moves in one direction, said guide being shorter than the overall travel of the bar whereby the pivoted member clears the guide before the bar reaches the limit of its travel and the said pivoted member may be actuated by the spring to bring its terminal to tube engaging position when the bar is at the limit of its return stroke and remains in said position until the bar in moving in the opposite direction until it again reaches the point where said means for moving the pivoted member into confined position back of the guide is next reached.

12. In a collapsible tube handling mechanism, a rotatable transfer wheel having a hub and a plurality of equally spaced tube supporting pins thereon, a reciprocable pusher mechanism having two tube pushers thereon which are positioned adjacent the path of travel and move axially relatively to each of two pins on opposite sides of the hub, one pusher being operable to move a tube from an adjacent supporting mandrel onto a pin while the other simultaneously operates to push a tube off the pin which it is adjacent, said pushers being operative upon movement of the pusher mechanism in one direction, means for reciprocating the pusher, and means operated by said last named means for imparting increments of rotation to said hub in one direction only and only when the pushers are moving in the direction opposite the one in which they are effective, the increments of rotation being such as to bring each pin successively into position at different times adjacent the respective pushers.

13. In the mechanism described in claim 12, a detent mechanism for indexing the hub in exact position and restraining it against free rotation.

14. In a collapsible tube handling machine having the mechanism defined in claim 12 wherein the hub has indexing notches therein spaced correspondingly to the spacing of the pins, and a spring projected detent adjacent the hub cooperating with notches in succession for holding the wheel against free rotation.

15. The mechanism defined in claim 12 wherein the hub is on a horizontal axis and the pins are radial and the pusher mechanism includes a horizontal bar traversing the plane of the axis of rotation of the hub and at right angles to the axis, the respective pushers being on the bar at opposite sides of the said axis of rotation.

16. The mechanism defined in claim 15 wherein the pins have a shoulder spaced from the periphery of the hub to prevent the tubes on the pins from contacting the hub.

17. The combination with a tube coating machine of the class described comprising an intermittently movable turret with equally spaced tube supporting mandrels thereon, of means for applying tubes to the successive mandrels at one station, means at another station movable along the mandrel for successively stripping tubes which have been coated from the mandrels, a relatively fixed transfer wheel intermittently rotatable having pins thereon which are successively moved into position to receive tubes which are removed from the mandrel by the stripper, a pusher adjacent the transfer wheel at a station removed from the stripper movable along the pins at said station for successively removing tubes from the transfer wheel, a conveyor having pins that are successively brought into position to receive tubes removed from the wheel by the pusher, a crank driven by the coating machine, a linkage operated by the crank, means driven by the linkage for operating the said stripper and pusher, means driven by the linkage for intermittently rotating the transfer wheel through an increment sufficient to bring the pins thereof one at a time in position to receive tubes removed by the stripper and at a time when the stripper is not operating to remove a tube, and means driven by the linkage to move the conveyor in increments to successively bring its pins into position to receive tubes from the wheel and at a time when the pusher is not operating to push a tube off the wheel.

18. In a collapsible tube processing apparatus in which a tube is transferred from one intermittently moving supporting pin on one mechanism to an intermittently moving supporting pin on another mechanism, a transfer device comprising a wheel in fixed relation to both mechanisms having a series of pins thereon which are brought by rotation of the wheel into confronting axial alignment with the pin of one of said mechanisms and then the other, and a mechanism movable along the supporting pin from which a tube is to be removed for sliding a tube by engagement with an end thereof off the supporting pin of one of said two mechanisms onto the aligned pin of the transfer wheel and sliding another tube by engagement with an end thereof from a pin on the transfer wheel to a supporting pin on the other of the two mechanisms whereby the tubes are transferred without their exterior surfaces being contacted.

References Cited in the file of this patent

UNITED STATES PATENTS

| | | |
|---|---|---|
| 1,839,438 | Prussing | Jan. 5, 1932 |
| 2,100,441 | Greene | Nov. 30, 1937 |
| 2,175,560 | Friden | Oct. 10, 1939 |
| 2,378,855 | Kronquest | June 19, 1945 |
| 2,381,185 | Rogers et al. | Aug. 7, 1945 |
| 2,501,224 | Kadell | Mar. 21, 1950 |

FOREIGN PATENTS

| | | |
|---|---|---|
| 666,040 | Germany | Oct. 8, 1938 |